Patented July 15, 1941

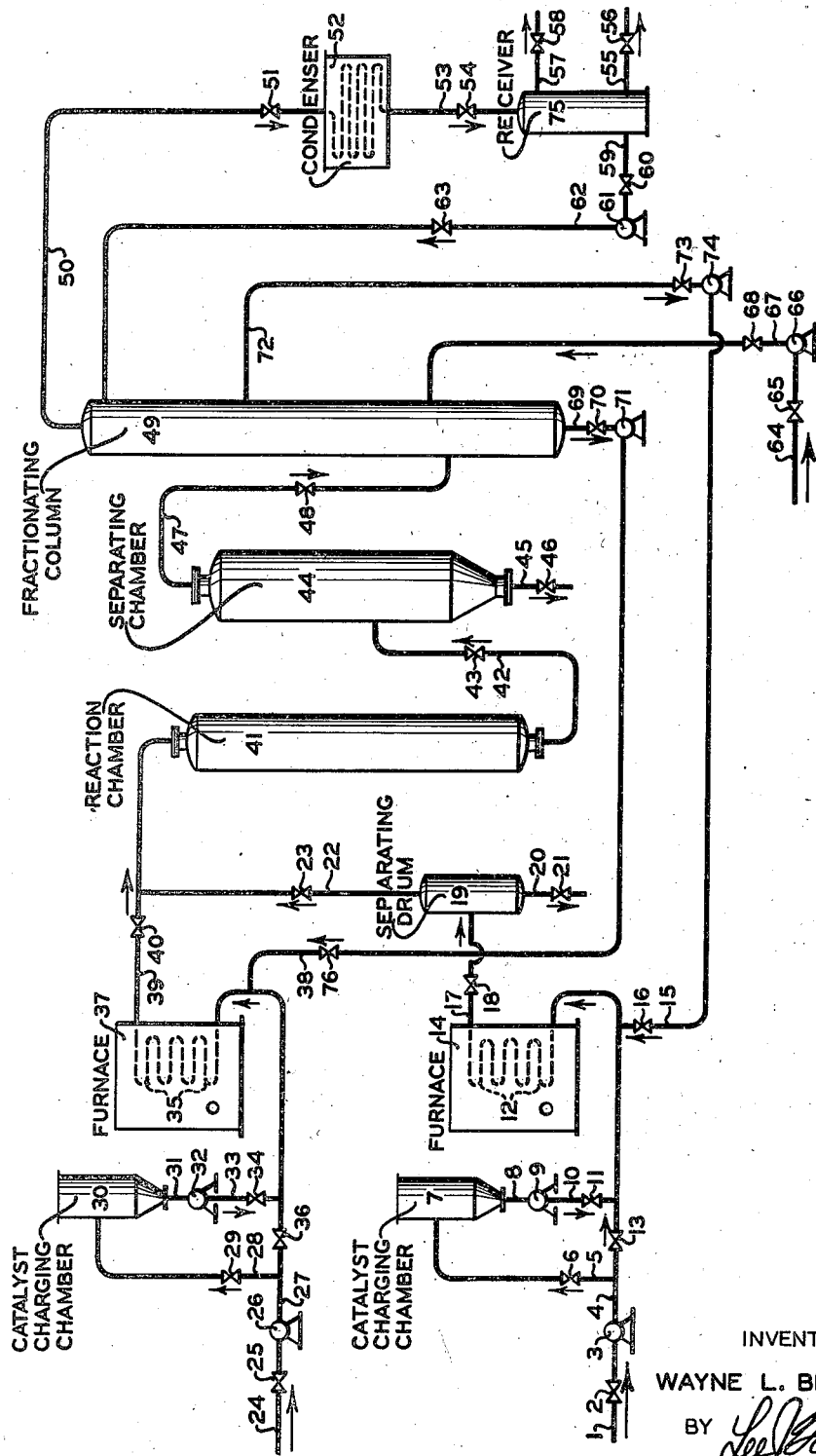

2,249,595

UNITED STATES PATENT OFFICE 2,249,595

CATALYTIC TREATMENT OF HYDROCARBONS

Wayne L. Benedict, Chicago, Ill., assignor to Universal Oil Products Company, Chicago, Ill., a corporation of Delaware Application July 20, 1940, Serial No. 346,499

7 Claims. (Cl. 196—48)

This invention relates to catalytic treatment of hydrocarbon oil to produce a large yield of high antiknock gasoline. In general, it is concerned with the selective treatment of hydrocarbon oil fractions in the presence of specific catalysts so as to convert the respective fractions under selected conditions of operation and contact with the catalysts. Petroleum fractions or hydrocarbon oils generally may be processed which do not decompose to a large extent upon ordinary vaporization or deposit excessive amounts of carbonaceous material when contacted with the catalysts.

Hydrocarbons undergoing conversion treatment in the presence of catalysts may be contacted with the catalyst in fixed beds disposed in chambers or with the catalyst in a powdered form. In the case of stationary catalysts, a plurality of chambers is usually provided and continuous plant operation is obtained by regenerating or conditioning one or more of the chambers while one or more of the chambers are in process of catalytic cracking treatment. In the case of mobile catalysts, the processing is simpler, particularly when catalyst powders are employed. The catalysts are mixed with the streams of oil undergoing treatment and the spent catalysts are separated from the vaporous reaction products and removed. They may then be regenerated outside the reaction zone. The process of this invention is of the latter type and provides a method for processing the hydrocarbon fractions selectively and separately recovering the spent catalysts.

In one specific embodiment the present invention comprises suspending a reforming catalyst powder in a low boiling fraction having a low antiknock value, mixing with said hydrocarbon fraction a relatively light insufficiently converted hydrocarbon fraction from the process and heating the mixture at conditions of time, temperature and pressure to convert said hydrocarbon oil into a large yield of high antiknock gasoline, separating a mixture of spent reforming catalyst and a non-vaporous oil from vaporous reaction products and recovering said spent catalyst and oil, separately suspending a cracking catalyst powder in a higher boiling hydrocarbon oil fraction, mixing with said hydrocarbon fraction a relatively heavy insufficiently converted hydrocarbon fraction from the process and cracking said oil and catalyst mixture at conditions of time, temperature and pressure to produce a substantial yield of high antiknock gasoline, commingling vaporous products from said reforming treatment with the reaction products from said cracking treatment and extending the catalytic cracking treatment thereof, separating the mixed reaction products into vaporous products and a non-vaporous liquid residue containing the spent cracking catalyst, removing the non-vaporous residue and recovering the oil and the cracking catalyst, fractionating the vaporous products so as to remove overhead vaporous products containing said high antiknock gasoline and normally gaseous hydrocarbons, and to condense higher boiling insufficiently converted hydrocarbons into relatively light and relatively heavy reflux condensate fractions for admixing with said hydrocarbon fractions admitted to the process.

In general, a hydrocarbon fraction such as a naphtha having low antiknock value, boiling substantially within the motor fuel boiling point range and a relatively clean higher boiling hydrocarbon oil fraction are separately and selectively processed in contact with catalyst powders to obtain a large yield of high antiknock gasoline. The relatively light fraction of hydrocarbon oil is processed in the presence of a reforming catalyst powder and substantially spent catalyst is removed from the reaction products prior to commingling with hydrocarbons undergoing cracking treatment in the presence of cracking catalyst powder. The catalysts are thereby separated so as to regenerate or revivify them for further use according to their respective functions. Other objects and advantages of the invention will become apparent in connection with the description of a specific flow and the illustrative example.

The catalyst powder employed in the catalytic cracking treatment may be from a naturally occurring material or may be an artificial catalyst of a porous and refractory nature such as the type consisting essentially of siliceous and aluminous material. The particular catalytic material employed will vary with the extent of the catalytic cracking of the oil, the manner of handling the spent catalyst and the character of the gasoline product. Untreated or acid-treated clays, kieselguhr, fuller's earth and other siliceous materials having added difficultly reducible oxides in some cases, are useful. Synthetically composited catalysts such as hydrated silica and hydrated alumina concurrently or separately precipitated and preferably washed free from detrimental adsorbed impurities are particularly useful. Special methods may be employed in the preparation of these catalysts in the presence of added substances such as salts whereby a finely divided powder of low density is obtained.

Generally speaking, the primary and major component is a precipitated hydrated silica which is admixed with a precipitated hydrous metal oxide such as alumina, zirconia, or mixtures thereof, and present in minor proportions. According to one general method of preparation the hydrated silica may be precipitated from a dilute solution of a commercial water-glass under carefully regulated conditions. The hydrated silica may be admixed with the hydrous oxide components in any suitable manner, as for example, by suspending the precipitated hydrated silica in a solution of a metal salt and precipitating the corresponding hydrous oxide in the presence of the suspended hydrated silica by the addition of a suitable alkaline precipitant. Various other procedures may be followed wherein these components may be co-precipitated or separately precipitated, and the components intimately admixed whether one or more hydrous oxides are composited with the hydrated silica. Added hydrous oxides may be simultaneously or consecutively deposited. The hydrated silica may also be heated in solutions of metal salts and hydrous oxides deposited in the presence of hydrated silica by hydrolysis, or the precipitated hydrated silica may be admixed with a relatively concentrated solution of a metal salt to form a paste and then heated to deposit the desired metal oxides. Where alkali metal impurities such as sodium compounds have been adsorbed into the catalytic material during preparation, it may be treated at some state of its preparation in order to remove alkali metal impurities. The finished catalysts of the preferred synthetic type contain in addition to the hydrated silica, alumina and/or zirconia varying in amount over a relatively wide range, particularly good results having been obtained when using 5 to 30 weight per cent of added alumina and/or zirconia.

While the above described silica-alumina type catalysts are particularly useful in catalytic cracking reactions, they may also be employed in the reforming reactions carried out in the present process. Other reforming catalysts may also be utilized however, such as activated alumina supporting oxides of the elements in the left-hand column of groups IV, V and VI of the periodic table. In these catalysts the alumina constitutes the major component whereas the remaining components are present in minor proportions. Various other oxides have been utilized as the major component such as zinc oxide, titanium oxide and others but good results are obtained when utilizing activated alumina which is apparently in the gamma form. Although the activated alumina may be used in the preparation of the catalyst, it is also possible to utilize aluminum hydroxide or aluminum hydrate which may be subsequently dehydrated and activated at a temperature of approximately 1200° F. The added oxide is preferably an oxide of chromium which when the catalyst is properly prepared is in the sesquioxide form. A solution of chromium trioxide is usually added to the activated alumina preferably while in a fine state of division and is subsequently dried and calcined at a temperature of approximately 850–1200° F. From 5 to 35% or more of chromium sesquioxide, based on the activated alumina, is effective in this form of catalyst. Various other oxides may be added to the alumina-chromia during preparation such as soluble magnesium and zinc compounds which upon subsequent calcination yield minor amounts of oxides of these elements which serve to stabilize the activity of the alumina-chromia catalyst. Thus, a catalyst may be prepared which consists of approximately 86% of alumina, 12% chromia and 2% of zinc oxide which in the powdered form is highly suitable for use in the reforming reactions subsequently described.

The accompanying drawing illustrates diagrammatically in conventional side elevation one specific form of apparatus which may be used to accomplish the objects of the invention. It is not drawn to any exact or relative scale and serves only as an illustration of the basic features constituting the invention.

Referring to the drawing, a hydrocarbon fraction boiling substantially within the motor fuel boiling point range and having low antiknock value is admitted to the process through line 1 and valve 2 leading to pump 3 which pumps this oil into line 4 from which a part or all of the oil may be directed into line 5 regulated by valve 6 and into the catalyst charging chamber 7. A suitable reforming catalyst powder is continuously supplied to this chamber in the desired proportions and a slurry thereof is formed in the charging stock admitted to the catalyst charging chamber. The slurry of oil and catalyst is removed from the catalyst charging chamber 7 through line 8 leading to pump 9 which pumps the catalyst in oil suspension through line 10 containing valve 11 into line 4 leading to the heating element 12. Charging stock leaving the pump 3 and not directed to the catalyst charging chamber 7 flows through valve 13 and thence in admixture with the catalyst in oil suspension to the heating element 12 which is located in a suitable furnace 14. A partially converted hydrocarbon fraction separated in fractionating column 49 as hereinafter described may be admixed with the oil directed to heating element 13 through line 15 regulated by valve 16. This oil and catalyst mixture is heated to a temperature within the approximate range of 900–1200° F. and at a pressure within the approximate range of atmospheric to 1000 pounds or more per square inch. The reaction products leave the heating element 12 through line 17 regulated by valve 18 and flow to the separating drum 19 where a small amount of non-vaporous residue is separated containing the substantially spent reforming catalyst and is withdrawn through line 20 regulated by valve 21. Vaporous products are removed from the separating drum 19 through line 22 containing valve 23 and are directed into the reaction products from catalytic cracking as will be hereinafter described.

A portion or all of a higher boiling hydrocarbon oil may be admitted to the process through line 24 containing valve 25 leading to pump 26 which pumps it into line 27 from which a portion or all of this oil may be directed through line 28 regulated by valve 29 into the catalyst charging chamber 30. A cracking catalyst powder is admitted continuously to this chamber and a slurry thereof is made in the charging stock admitted thereto. The slurry of catalyst in oil is removed from the catalyst charging chamber through line 31 leading to pump 32 which pumps the catalyst in oil suspension through line 33 containing valve 34 into line 27 leading to heating element 35. Oil leaving pump 26 through line 27 and not directed to the catalyst charging chamber flows through line 36 and is mixed with the catalyst-containing oil flowing to the heating element 35 located in suitable furnace 37. Insufficiently converted hydrocarbons produced in the fractionating column 49 as hereinafter described may be admitted through line 38 regulated by valve 76 into the oil and catalyst flowing through line 27 to the heating element 35. The temperature employed in heating element 35 is within the approximate range of 700 to 1050° F. and the pressure, from atmospheric to 1000 pounds per square inch.

The partly reacted catalyst in oil suspension leaving heating element 35 flows through line 39 regulated by valve 40 into the reaction chamber 41 together with vaporous reaction products which are introduced through line 22 as hereinabove described. The hydrocarbon vapors are further converted in the reaction chamber 41 in the presence of the partially used cracking catalyst powder. The reaction products are withdrawn through line 42 regulated by valve 43 and directed into the separating chamber 44 where nonvaporous residue containing substantially spent cracking catalyst is separated from the vaporous products. Non-vaporous residue containing the substantially spent cracking catalyst is removed through line 45 regulated by valve 46 and the spent catalyst and oil are separated and substantially recovered by conventional means not shown. The catalyst may be regenerated by various processes such as solvent treatment and/or treatment under oxidizing conditions to remove hydrocarbonaceous deposits. Vaporous products are removed at the top of separating chamber 44 through line 47 containing valve 48 and flow into the fractionating column 49 where insufficiently converted hydrocarbons are separated from the overhead products consisting of motor fuel vapors and gaseous products. The vaporous and gaseous products are removed from the top of fractionating column 49 through line 50 containing valve 51 leading to the condenser 52 where these products are cooled and condensed, and thence directed through line 53 containing valve 54 into receiver 75 where liquid and gaseous products are separated. The unstabilized gasoline product is removed from receiver 75 through line 55 regulated by valve 56 and unstabilized gases are removed through line 57 regulated by valve 58. The gasoline and gas are then stabilized by conventional means not shown. A portion of the liquid product in receiver 75 is directed through line 59 containing valve 60 to pump 61 which pumps this oil through line 62 regulated by valve 63 to the top of the fractionating column 49 to assist in regulating the character of the overhead product. Hydrocarbon oil for catalytic cracking treatment, the same as oil introduced through line 24 or oil of similar character may be introduced to fractionating column 49 through line 64 containing valve 65 leading to pump 66 which pumps this oil through line 67 containing valve 68 to the fractionating column 49 where it assists in the cooling and separation of insufficiently converted hydrocarbons from gaseous and motor fuel products. Insufficiently converted hydrocarbons of relatively high boiling point which may have in admixture hydrocarbon oil charging stock introduced through line 67 may be withdrawn from the bottom of fractionator 49 through line 69 containing valve 70 leading to pump 71 which pumps this oil through line 38 containing valve 76 into the oil flowing to the heating element 35 through line 27 for catalytic cracking treatment as has been hereinabove described. A relatively light fraction of insufficiently converted hydrocarbons may be separated and withdrawn from the fractionating column 49 through line 72 containing valve 73 and leading to pump 74 which pumps this oil through line 15 containing valve 16 into the oil flowing through line 4 and admitted to heating element 12 for reforming treatment as hereinabove described.

The following example giving specific conditions in the above described flow is presented to illustrate the utility of the process but should not be construed as limiting the invention to the exact conditions employed.

A Mid-Continent straight run naphtha of 45° A. P. I. gravity having added thereto relatively light, insufficiently converted hydrocarbons from the process and containing approximately one percent by weight of a reforming catalyst powder consisting of approximately 86% alumina, 12% chromia and 2% magnesium oxide is reformed in a heating element at a temperature of approximately 975° F. under a pressure of 600 pounds per square inch. The mixture is directed to a separating drum where the pressure is lowered to approximately 200 pounds per square inch so that approximately 3% based on the naphtha fraction charged to the reforming treatment is separated as a non-vaporous residue containing the spent reforming catalyst. The vaporous reaction products are directed into reaction products from catalytic cracking flowing to a reaction chamber. A Mid-Continent gas oil cut of 33° A. P. I. gravity, having added thereto insufficiently converted hydrocarbons from the process of approximately similar boiling point range, is mixed with approximately one per cent by weight of the oil of precipitated silica-alumina catalyst powder having the approximate composition $100SiO_2:5Al_2O_3$ and is heated to approximately 1000° F. at a pressure of about 200 pounds per square inch. The reaction products therefrom are commingled with the vaporous reaction products from the reforming treatment above described and directed to a reaction chamber where the conversion treatment of the commingled vapors is extended at a temperature of approximately 830° F. The reaction products are then separated as described above. The non-vaporous residue containing spent cracking catalyst amounts to approximately 5% by weight of the gas oil charged to the process. As a result of this operation, a stabilized gasoline of 400° F. end point and approximately 7 pounds Reid vapor pressure is produced having an octane number of 76. The yield is approximately 73% of the oil charged to the process of which one-third is naphtha fraction and two-thirds is a gas oil fraction.

In a further illustrative example similar conditions are employed in the reforming treatment as in the above example with the exception of using 1% of the reforming catalyst and no return of insufficiently converted hydrocarbons. Similar conditions as in the above example are also employed in the catalytic cracking step without the return of insufficiently converted hydrocarbons. A yield of 50% of 400° F. end point gasoline is obtained having a 78 octane number and the oil corresponding to the insufficiently converted hydrocarbons is withdrawn from the system and provides a high grade domestic fuel.

I claim as my invention:

1. In a catalytic cracking process for the treatment of higher boiling hydrocarbons in the presence of cracking catalyst powders to produce substantial yields of high antiknock gasoline, the improvement which comprises mixing a reforming catalyst powder with a hydrocarbon oil consisting of a major proportion of hydrocarbons boiling within the gasoline boiling point range having low antiknock value, and subjecting said mixture to reforming conditions of temperature and pressure, separating the reaction products into a non-vaporous residue containing spent reforming catalyst and vaporous products, withdrawing said non-vaporous residue containing spent catalyst from the process and mixing said vaporous reaction products with said higher boiling hydrocarbons and catalyst powder undergoing said catalytic cracking treatment.

2. A selective process for catalytically converting hydrocarbon oil into a substantial yield of high antiknock gasoline which comprises subjecting a hydrocarbon oil fraction consisting for the major part of hydrocarbons boiling within the gasoline boiling point range and having low antiknock value, to reforming treatment in the presence of a reforming catalyst powder and separating the reaction products into a non-vaporous residue containing spent reforming catalyst and vaporous reaction products, withdrawing the non-vaporous residue containing spent catalyst from the process, separately mixing a cracking catalyst powder with a higher boiling hydrocarbon oil fraction and insufficiently converted hydrocarbons therefrom, subjecting the mixture to catalytic cracking conditions, commingling the vaporous reaction products from said reforming treatment with said mixture undergoing catalytic cracking treatment, separating the products therefrom into vaporous reaction products and a non-vaporous residue containing spent cracking catalyst, withdrawing said non-vaporous residue containing spent catalyst from the process and fractionating said vaporous reaction products to separate insufficiently converted hydrocarbons boiling above the gasoline boiling range, gasoline vapors and gas, cooling, condensing and separating the high antiknock gasoline from gas, and returning said insufficiently converted hydrocarbons to said catalytic cracking treatment.

3. A selective process for catalytically converting hydrocarbon oil into a substantial yield of high antiknock gasoline which comprises mixing a hydrocarbon oil fraction consisting for the major part of hydrocarbons boiling within the gasoline boiling point range having low antiknock value with a relatively light insufficiently converted oil from the process and subjecting said mixture to reforming treatment in the presence of a reforming catalyst powder, separating the reaction products into a non-vaporous residue containing spent reforming catalyst and vaporous reaction products, withdrawing the non-vaporous residue containing spent catalyst from the process, separately adding a cracking catalyst powder to a mixture of a higher boiling hydrocarbon oil fraction with a relatively heavy insufficiently converted hydrocarbon oil from the process and subjecting said mixture to catalytic cracking conditions, commingling the vaporous reaction products from said reforming treatment with said mixture of oil and catalyst undergoing cracking treatment, separating the products therefrom into vaporous reaction products and a non-vaporous residue containing spent cracking catalyst, withdrawing said non-vaporous residue containing spent cracking catalyst from the process and fractionating said vaporous reaction products to produce said relatively light and said relatively heavy insufficiently converted hydrocarbons, gasoline vapors and gas, cooling, condensing and separating the high antiknock gasoline from gas, and returning said insufficiently converted hydrocarbon fractions to said reforming and cracking treatments as set forth.

4. A process as set forth in claim 2 where a temperature of about 900° F. to about 1200° F. and a pressure of approximately atmospheric to about 1000 pounds per square inch is employed in said catalytic reforming treatment and a temperature of about 700° to about 1050° F. and a pressure of approximately atmospheric to about 1000 pounds per square inch is employed in said catalytic cracking treatment.

5. A process as set forth in claim 2 where the hydrocarbon oil is cracked in the presence of a silica-alumina cracking catalyst powder and where said hydrocarbon oil is reformed in the presence of a reforming catalyst powder comprising essentially a supported oxide of an element selected from the left-hand column of group VI of the periodic table.

6. A process as set forth in claim 2 where the hydrocarbon oil is cracked in the presence of a silica-zirconia cracking catalyst powder and where said hydrocarbon oil is reformed in the presence of a reforming catalyst powder comprising essentially a supported oxide of an element selected from the left-hand column of group VI of the periodic table.

7. A selective process for catalytically converting hydrocarbon oil into a substantial yield of high antiknock gasoline which comprises subjecting a hydrocarbon oil fraction consisting for the major part of hydrocarbons boiling within the gasoline boiling point range and having low antiknock value, to reforming treatment in the presence of a reforming catalyst powder and separating the reaction products into a non-vaporous residue containing spent reforming catalyst and vaporous reaction products, withdrawing the non-vaporous residue containing spent catalyst from the process, separating mixing a cracking catalyst powder with a higher boiling hydrocarbon oil fraction and subjecting the mixture to catalytic cracking conditions, commingling the vaporous reaction products from said reforming treatment with said mixture undergoing catalytic cracking treatment, separating the products therefrom into vaporous reaction products and a non-vaporous residue containing spent cracking catalyst, withdrawing said non-vaporous residue containing spent catalyst from the process and fractionating said vaporous reaction products to separate hydrocarbons boiling above the gasoline boiling range, gasoline vapors and gas, and cooling, condensing and separating the high antiknock gasoline from gas.

WAYNE L. BENEDICT.